United States Patent Office 3,421,484
Patented Jan. 14, 1969

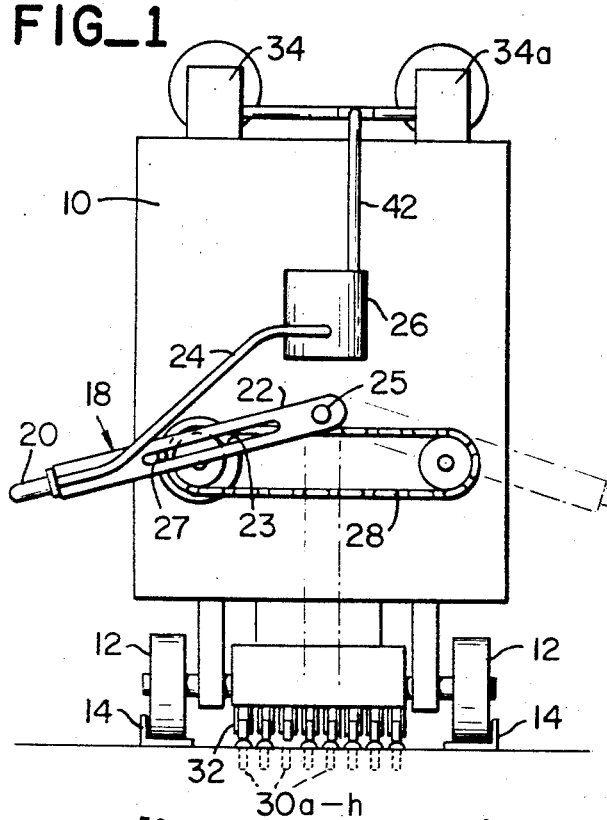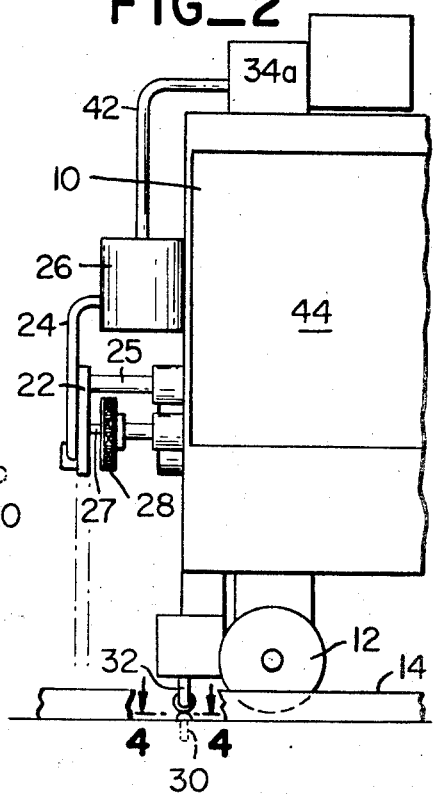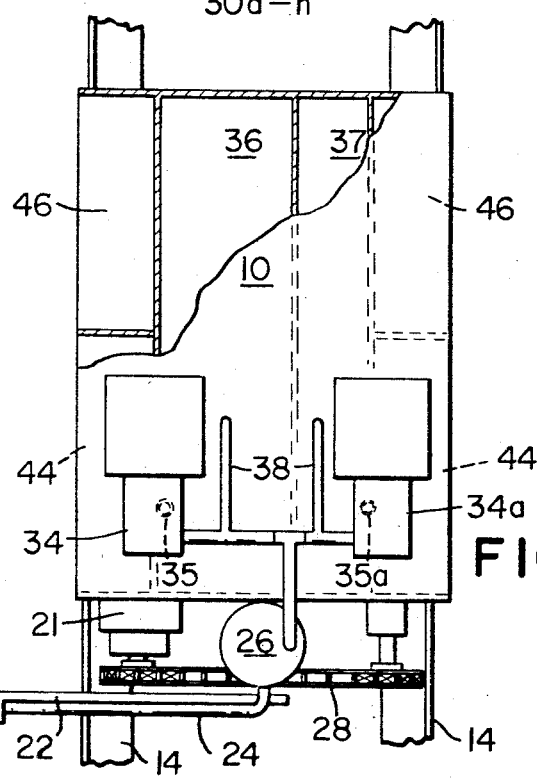

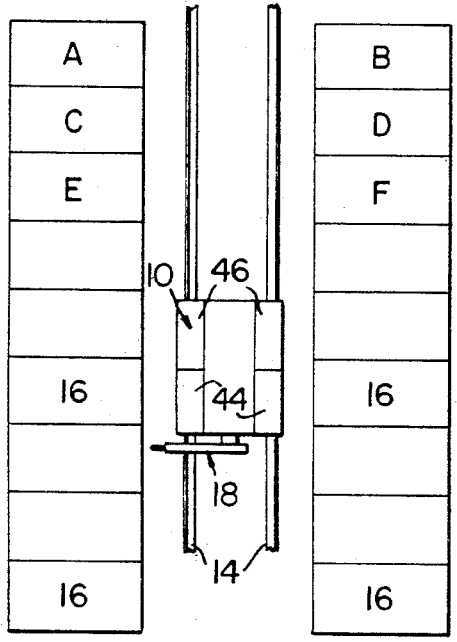
FIG_5
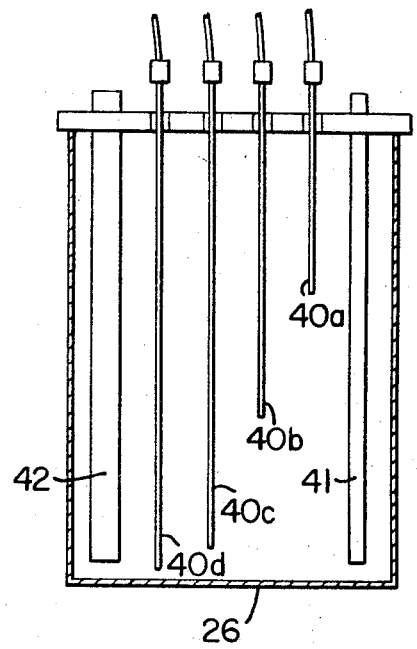
FIG_6
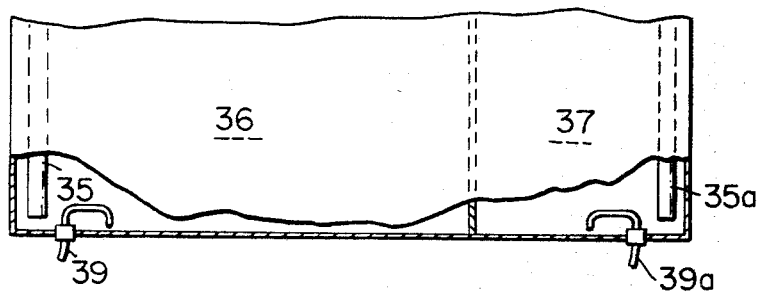
FIG_7

3,421,484
AUTOMATIC ANIMAL FEEDING DEVICE WITH RETRACTABLE NIPPLE
Andrew J. Flocchini, 7078 Lakeville Highway, Petaluma, Calif. 94952
Filed Jan. 6, 1967, Ser. No. 607,737
U.S. Cl. 119—71        7 Claims
Int. Cl. A01k 9/00, 7/00

ABSTRACT OF THE DISCLOSURE

An automatic animal feeding apparatus for periodically feeding suckling animals in stalls and provided with a feeding nipple assembly which retracts when the supply of liquid feed is exhausted in order to prevent the sucking of air and further provided with bypass pipes for keeping the feed supply mixed and separate tanks for exhausting the older liquid feed prior to supplying the fresh liquid feed.

Background of the invention

The present invention relates generally to automatic livestock feeding devices and, more particularly, to devices for feeding suckling animals maintained in individual pens or stalls.

In prior art devices of which I have knowledge, it is the practice to regulate the feeding of individual animals solely by means of timing devices which cause the entire carriage carrying the feeding mechanism to move away from the animal in its stall after a preselected period. If the animal feeds slowly, it will not have finished feeding when the carriage moves on to the next feeding station. If, however, the animal is a fast feeder, it will continue sucking on the nipple after the milk supply is exhausted and will ingest quantities of air. This results in bloat and colic in animals such as young calves. These conditions will cause loss of appetite in the animal, loss of weight and illness.

Summary of the invention

My invention comprises a livestock feeder having a plurality of stalls and a carriage movable past the stalls, a nipple mounted on the carriage and movable between a feeding position and a retracted position while the carriage remains stationary, control means for retracting the nipple when the supply of liquid feed is exhausted, and additional control means for controlling the length of time the carriage is in a feeding position opposite a stall.

The timed feeding cycle coupled with the retractable nipple permits the provision of means for feeding liquid feed, solid feed, and hay to animals in adjacent stalls. Animals usually feed more slowly on the solid feed and hay, so that if only a timed cycle suitable for solid feed were provided, the animal consuming liquid feed would exhaust its individual supply with the results described above. By providing a retractable nipple assembly my invention permits the combined feeding of animals without the problems associated with solely timed cycles.

It is an object of the invention to provide a novel means for periodically nipple-feeding a large number of animals in separate stalls whereby the animals will be precluded from sucking air when the liquid feed supply to an individual animal is exhausted.

Another object of the invention is to provide means for feeding solid feed to the animals while at the same time feeding liquid feed to adjacent animals.

Still another object of the invention is to provide means for keeping the liquid feed supply mixed to preclude settling out of any of the nutrients thereof.

A still further object of the invention is to provide a novel nipple assembly for feeding suckling animals whereby said nipple assembly will be retracted out of reach of the animal when the animal completes its feeding.

Still another problem encountered in the automatic feeding of suckling animals is that part of the supply of liquid feed invariably remains in the supply tank upon completion of a cycle of feeding. If fresh liquid feed is added to the supply tank in which liquid feed remains, the fresh feed will likely turn sour before the completion of a complete additional cycle.

Accordingly, it is another object of the invention to provide a novel means for permitting the supply of liquid feed remaining from the prior cycle to be exhausted prior to the use of fresh liquid feed during a subsequent feeding cycle.

Other objects and advantages of the present invention will become apparent upon reading the following specifications and referring to the accompanying drawings in which corresponding numerals represent corresponding parts in each of the several views.

Brief description of the drawings

In the drawings:

FIG. 1 is an end elevation of the carriage forming part of the livestock feeder;

FIG. 2 is a partial side elevation of the carriage;

FIG. 3 is a top plan view of the carriage;

FIG. 4 is a top plan view of the actuating pegs taken along the line 4—4 of FIG. 2;

FIG. 5 is a diagrammatic plan view of the feeder showing the carriage disposed between the rows of stalls;

FIG. 6 is an enlarged sectional view of an individual feeding jar; and

FIG. 7 is an enlarged partial section of the liquid feed supply tanks.

Description of the preferred embodiment

Referring now more particularly to the drawings, shown generally at 10 is the carriage which is mounted upon wheels 12 which ride upon suitable tracks 14 disposed parallel to and between rows of stalls 16 within which the animals are kept. The carriage is provided with suitable means (not shown) connected to the wheels for propelling the carriage 10 forward and for reversing the carriage at the end of the rows of stalls. The control of the movement of the carriage will be through appropriate circuitry (not shown) as will be more fully explained herein.

The nipple assembly 18 is shown in FIG. 5 in feeding position opposite a stall. As may be more clearly seen in FIG. 1, the nipple assembly comprises a nipple 20 suitably mounted on a pivotally mounted nipple arm 22, a flexible tube 24 connecting pivotally mounted nipple arm 22, a flexible tube 24 connecting the nipple to the individual milk supply jar or canister 26, a chain drive 28 for pivoting the nippel 20 and nipple arm 22 from a feeding position such as is shown in FIG. 1, to a vertical, nipple-down, rest position shown by dashed lines in FIG. 1 and then to a feeding position on the opposite side of the carriage as is shown by the other dashed lines in FIG. 1.

The usual method of operation of the apparatus is to set a suitable time delay relay of the usual type to start a cycle of feeding after a preselected timed interval. This interval will depend upon the number of animals, their age and physical condition. When the relay is energized, the carriage is moved from its starting point to a point opposite the first feeding station A. The location of station A is shown in FIG. 5. At a point adjacent the feeding station a series of trip devices, such as the pegs 30 is disposed to operate corresponding switches 32 such as the well-known microswitch.

A switch will be tripped by either peg 30a or 30b depending upon which peg is placed in its appropriate receptacle. This, in turn, will depend upon the amount of milk which the operator desires to be put into the individual milk supply canistor 26 for the animal in that feeding station. Peg 30c is connected with the carriage motor circuitry. If there is no animal in stall A, no peg is placed in position 30c and the carriage will not stop in front of that stall. If there is an animal in stall A, peg 30c will halt the carriage in front of stall A. Peg 30d is a spare to permit additional circuitry to be actuated should that be necessary.

The first switch will actuate pump 34 which will pump a supply of milk from the supply tank 36 on the carriage to the individual canistor 26. The piping from pump 34 is so arranged that approximately one-half of the milk being pumped is bypassed through pipe 38 to be returned to the supply tank 36. This results in the milk supply within the supply tank being effectively mixed in order to preclude settling out of nutrients and the concomitant clogging of supply lines.

The individual milk supply canister 26 is equipped with electrodes or probes 40 for regulating the amount of milk to be fed to an individual animal. The canister 26 may be connected electrically to the "ground" side of the circuit, or one of the probes, such as 40d, may be utilized as the "ground." The milk enters the canister through supply pipe 42. When the milk touches probe 40c, appropriate circuitry starts the nipple motor 21 which causes the nipple arm 22 to be moved from its vertical nipple-down rest position to the feeding position shown in FIG. 1.

This movement is accomplished by means of the nipple motor 21 and chain drive 28 previously described. When the nipple motor is actuated, it causes the chain 28 to move. Attached to the chain is an actuating link 27 which moves in slot 23 in the nipple arm 22. The arm 22 is pivotally mounted on a fixed pivot 25. As the link moves in the slot 23, the entire arm rotates about the pivot 25 until the nipple 20 is in proper feeding position. Appropriate trip bars are affixed to chain 28 so that when the nipple reaches feeding position, the nipple motor is shut down through the use of trip switches and appropriate circuitry (not shown). The nipple remains in feeding position until the motor is reactivated.

As the nipple is moving into position, milk is being pumped into the canister 26. Depending upon which peg has been tripped (30a or 30b), when the milk supply within the canister reaches corresponding probe 40a or 40b, the pump 34 is shut down by appropriate circuitry. The nipple has by then reached feeding position as previously described and the animal may then commence feeding. The milk is supplied to the nipple through outlet supply pipe 41 which is connected to the flexible tube 24.

When the milk supply in the canister falls below probe 40c while the animal is feeding, appropriate circuitry will energizes the nipple motor 21 and retract the nipple from the animal's mouth to preclude its sucking air from the canister when the liquid feed has been exhausted. The nipple will retract to the vertical nipple-down rest position and stop.

In addition to the circuitry which, as above described, precludes the animal from sucking air from a canister from which the liquid feed supply has been exhausted, there is also provided a time delay sequence to maintain the carriage in front of the feeding position even through the nipple has been retracted from the animal's mouth. This time delay serves several functions. The first is to make certain that a slow-feeding animal will be permitted to feed for the entire preselected time. If the animal has not consumed sufficient liquid feed to actuate the nipple motor 21 to retract the nipple, the expiration of the time delay sequence for the individual animal stall will cause the retraction of the nipple. The other functions of the time delay sequence opposite the stall will be described hereafter.

Pegs 30e, 30f, 30g and 30h are connected with appropriate circuitry to control the carriage and the nipple mechanism for stall B. Pegs 30e and 30f correspond to pegs 30a and 30b to control the amount of liquid feed to be supplied to the canister when the nipple assembly is in position to feed the animal in stall B. Peg 30g corresponds to peg 30c and is the control peg for the carriage motor. If there is no animal in stall B, no peg is placed in position 30g and therefore the carriage will not pause there, but move on to a position opposite stalls C and D after completion of feeding at stall A.

The pump 34 will now be energized once again in order to supply milk to the canister for feeding the animal in the opposite stall, B. The cycle for filling the cainster, moving the nipple into feeding position and retracting the nipple after feeding is identical to that heretofore described for stall A. After completion of feeding liquid feed at stall B, the nipple assembly will once again retract to the vertical position heretofore described.

After a prearranged time delay, the carriage motor will be energized again to advance the carriage 10 to a feeding station opposite stalls C and D where the entire cycle of feeding will be repeated starting with stall C and ending with stall D. A series of pegs similar to the pegs 30 is located adjacent stalls C and D for the same purposes as heretofore described.

While the animals in stalls C and D are being fed liquid feed, the animals in stalls A and B will be taking hay or other solid food from appropriate receptacles 44 on each side of the carriage 10 adjacent the nipple assembly. The time delay in moving from each pair of stalls after the liquid feed has been consumed is designed to permit the animals to feed on the solid food, that is, hay and feed or similar food, after the liquid feed, and the animals may continue to consume the solid feed from the appropriate receptacles even though the animal taking liquid feed has consumed the supply of liquid feed and the nipple has retracted.

When the nipple is in feeding position for stalls E and F, receptacles 46 with which the carriage 10 is provided will be in position in front of stalls A and B. Therefore, the animals may be fed liquid feed, then hay, then feed, in that order.

After the last animals in the row have consumed their liquid feed, the carriage will continue onward for two complete timed feeding cycles so that the animals in the last stalls will be fed both hay and feed. Upon completion of the final feed cycle, appropriate circuitry will cause the carriage motor to reverse and return the carriage to its starting position near stalls A and B.

After completion of a feeding cycle, some of the liquid feed will remain in the supply tank 36, as it is necessary to store more liquid feed in the supply tank than will be consumed by the animals during a feeding cycle. This, of course, is necessary in order to preclude the exhaustion of the liquid feed supply prior to the completion of the feeding of each of the animals. If, prior to the starting of a new feeding cycle, fresh liquid feed is added to the liquid feed which remains in the tank, there is a substantial likelihood that the entire supply of liquid feed will turn sour, especially in warm weather.

The carriage 10 is therefore provided with an additional supply tank 37. After the completion of a feeding cycle, the remaining supply of liquid feed in the storage tank 36 is transferred to the additional supply tank 37. Tank 36 is provided with a similar probe 39a at its bottom. When the liquid feed supply covers either probe 39 or 39a, appropriate circuitry is energized whose function will be described.

At the beginning of the feeding cycle, the liquid feed left over from the prior cycle is transferred to storage tank 37 from tank 36 and a supply of fresh liquid feed is added to storage tank 36 after the tank is cleaned. When probe 39a is covered with liquid feed, the circuit to which it is connected is energized. Therefore, when either peg 30a or 30b is tripped opposite the first stall, appropriate circuitry will cause pump 34a to pump the liquid feed supply to the supply canister 26 for feeding to the first animals in stalls A, B and so on. When the liquid feed supply is exhausted from storage tank 37, the circuitry through probe 39a is de-energized and a relay is actuated which will cause pump 34 to supply the liquid feed thereafter to canister 26 from storage tank 36. The complete feeding cycle is thereafter completed using the liquid feed supply in the main storage tank 36.

If for some reason the liquid feed supply in the main storage tank 36 is exhausted during the normal feeding cycle, the circuit through probe 39 will be de-energized and appropriate circuitry will shut down the carriage and sound alarm to summon the person in charge to refill the storage tank 36.

These and other modifications of my invention may be provided, it being understood that the form of my invention, as described above, is to be taken as a preferred example of the same.

I claim:

1. A livestock feeder comprising: a plurality of individual animal stalls arranged side by side; a carriage movable past said stalls; means coupled with said carriage for reversible movement of the carriage past said stalls; means for stopping said carriage adjacent each of said stalls; a nipple mounted upon said carriage for movement between a feeding position and a retracted position adjacent each of said stalls; means for moving said nipple between said feeding position and said retracted position; means on said carriage for holding a supply of liquid feed; means for conducting said liquid feed to said nipple; first control means for controlling length of time said nipple is in a feeding position; second control means for retracting said nipple when feed supply for each of said feeding positions is exhausted; said second control means adapted to retract said nipple independently of the first control means when the feed supply for a feeding position is exhausted; and said first control means adapted to retract said nipple after a preselected time independently of said second control means when a preselected time has elapsed.

2. The livestock feeder of claim 1 wherein there are two parallel rows of stalls opposite each other and the carriage is adapted to move between the rows, and wherein said nipple is mounted upon the carriage for movement between a feeding position adjacent a stall in one row, a feeding position adjacent a stall in the opposite row, and a retracted position intermediate said feeding positions while the carriage remains stationary.

3. The livestock feeder of claim 1 wherein said means for holding a supply of liquid feed comprises a first receptacle and a second receptacle and provided with means for transferring liquid feed from the first receptacle to the second receptacle and further provided with switching means for exhausting the liquid feed in the second receptacle prior to use of the liquid feed in the first receptacle.

4. The livestock feeder of claim 1 wherein said means for conducting said liquid feed to said nipple includes: a container for holding sufficient liquid feed for an individual animal, means for supplying liquid feed to said container from said supply means and means associated with said supply means for diverting part of said liquid feed supply for said container and returning it to said supply means whereby said liquid feed is kept in mixed condition.

5. The livestock feeder of claim 1 wherein said carriage includes at least one food container means adjacent the nipple assembly, said food container means disposed adjacent the animal stalls whereby an animal may consume liquid feed from said nipple and an adjacent animal may have access to said food container means.

6. For use in a mobile livestock feeder a retractable nipple assembly comprising an arm, a nipple mounted on said arm, means for moving said arm between a feeding position and a retracted position, means for conducting liquid feed to said nipple and means for mounting said nipple assembly on a mobile livestock feeder, said nipple assembly having means for providing retractable movement independent of movement of said livestock feeder, said means for moving said nipple assembly between a feeding position and a retracted position includes first control means for controlling length of time said nipple is in feeding position and second control means for retracting said nipple when liquid feed supply for said feeding position is exhausted, and said first control means retracting said nipple assembly independent of exhaustion of the liquid feed supply after the nipple assembly has been in feeding position for a preselected time.

7. The invention of claim 6 and including a carriage, said retractable nipple assembly mounted on said carriage, said carriage having at least one food container means adjacent the nipple assembly whereby when an animal is consuming liquid feed from said nipple an adjacent animal may have access to said food container means.

References Cited

UNITED STATES PATENTS

| 3,081,738 | 3/1963 | Heron | 119—71 |
| 3,204,607 | 9/1965 | Arnold et al. | 119—51.11 |
| 3,216,397 | 11/1965 | Pickard | 119—71 |

ALDRICH F. MEDBERY, *Primary Examiner.*